United States Patent [19]

Jackson

[11] 3,802,657

[45] Apr. 9, 1974

[54] TELEPHONE BRACKET

[76] Inventor: George Emmerd Jackson, 315 White Cottage Rd., Angwin, Calif. 94508

[22] Filed: Oct. 3, 1972

[21] Appl. No.: 294,658

[52] U.S. Cl. .............................. 248/214, 179/146 R

[51] Int. Cl. .............................................. A47f 5/00

[58] Field of Search ........... 248/214, 215, 302, 309, 248/314; 211/106, 112, 119, 181; 179/146 R

[56] References Cited

UNITED STATES PATENTS

| | | | |
|---|---|---|---|
| 2,615,576 | 10/1952 | Dahlgren | 211/181 X |
| 381,608 | 4/1888 | Beisonhert | 248/302 UX |
| 2,658,116 | 11/1953 | Skantze | 248/302 X |
| 2,924,671 | 2/1960 | Barry | 248/302 X |
| 2,036,010 | 3/1936 | Atkins | 179/146 R |

*Primary Examiner*—J. Franklin Foss

*Attorney, Agent, or Firm*—James J. Brown

[57] ABSTRACT

A bracket is provided for telephones which consists of a cradle for holding the telephone and means for attaching the telephone to a horizontal member. The invention is particularly adapted to be attached to bed rails in order to afford easy access to the telephone for the occupant of the bed. The bracket can be easily and inexpensively fabricated from a single unitary length of wire without the need for cutting or welding and, in a preferred embodiment, is especially adapted to accommodate a unitary telephone in which the microphone, dial and receiver are all contained in a single, hand-held unit.

7 Claims, 3 Drawing Figures

TELEPHONE BRACKET

This invention relates to a bracket for a telephone receiver. More specifically, the present invention is directed to a telephone bracket which can be removably attached to a horizontally-disposed member such as the side rail of a hospital bed, and which will hold a telephone receiver in an downright, vertical position where it is easily accessible to the occupant of the bed.

It is well recognized that for individuals confined to bed, particularly in hospitals or convalescent homes, a seriously demoralizing situation is often created by their inability to communicate readily with others outside their small area of confinement without first having to summon assistance. While one would expect that the telephone would provide an easy means for such persons to contact others, regrettably this has frequently not been the case. Typically, where telephones are provided in the rooms of persons confined to bed, they are located on tables or night stands alongside the bed. Thus, either to make or receive a call the person in the bed must usually turn on his side and/or reach backward even if the telephone is located in relatively close proximity to the head of the bed. Where the side rail normally present on hospital-type beds is raised or the person is infirm, this difficult maneuver becomes almost impossible.

It is accordingly an object of the present invention to provide a means whereby a telephone receiver can be easily positioned alongside an individual in a bed so that he can have ready access to the telephone either to make or receive calls without having to turn on his side or reach awkwardly beyond the immediate confines of the bed.

It is a further object of the present invention to provide an inexpensive and easily fabricated bracket for a telephone which can be quickly and easily attached to or removed from the side rail of a hospital-type bed or other horizontally-disposed member and which will not interfere with the raising or lowering of the side rail.

These and other objects which will become apparent, are achieved according to the present invention which provides a bracket for positioning a telephone receiver within easy reach and use of a person disposed within a bed.

The bracket of this invention comprises a cradle for holding a telephone receiver and means for attaching the cradle to a horizontal member such as the side rail of a bed. In one embodiment the bracket of the present invention is formed from a single, unitary elongated member, for example, a stiff piece of wire. In another embodiment the bracket of the present invention has the particular dimensions and configuration to accommodate a unitary telephone in which the microphone, dial and receiver are all contained in a single, hand-held unit. Such telephone units are described in U.S. Pat. No. 3,627,930 to Tolman and U.S. Pat. No. 3,400,226 to Krumreich et al. and are commonly called "Trimline" telephones.

Details of the present invention will, however, become apparent from a consideration of the drawings, which describe a preferred embodiment thereof.

Figures 1, 2, 3:
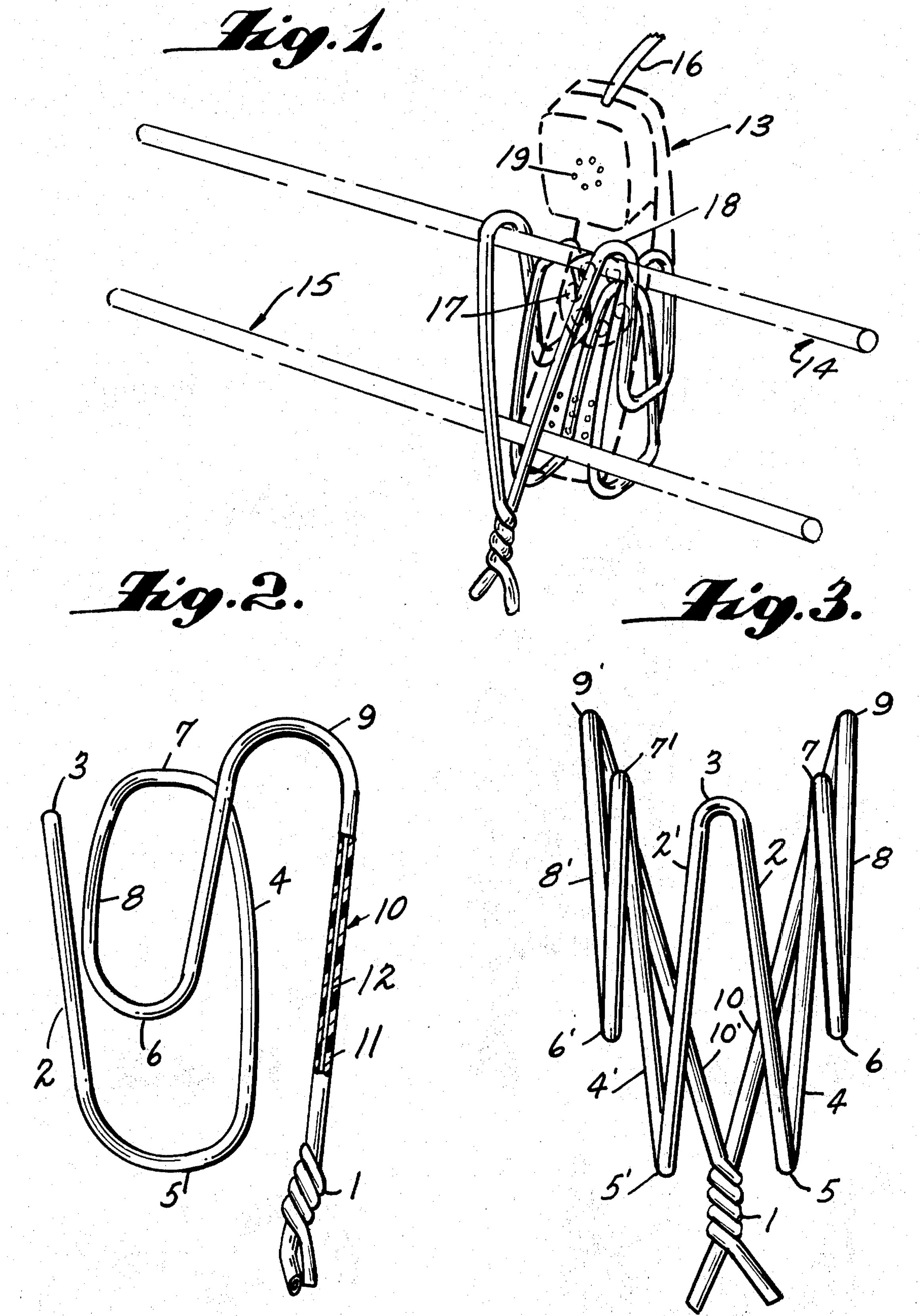
FIG. 1 is a perspective view of the bracket attached to two horizontal rails and with a "Trimline" type telephone shown in phantom, disposed in downright position.
FIG. 2 is a side view of the bracket with a cut-away showing a wire core beneath an outer plastic covering.
FIG. 3 is a front view of the bracket.

Referring now in detail to the drawings, it can be seen in FIGS. 2 and 3 that a downwardly-tapered cradle to receive the telephone is provided which consists of a bent, single, unitary piece of wire with its two ends twisted together at 1. At its midsection 3, the piece of wire is bent into an inverted U with downwardly-projecting legs 2 and 2′ to form the front of the cradle. The bottom of the cradle which holds the telephone is formed by the two equal lengths of wire 5 and 5′ projecting horizontally backward away from the front of the cradle and roughly at right angles to the downward-projecting legs, 2 and 2′. The sides of the cradle are tapered slightly inward at the bottom and are formed by the backward-projecting members 5 and 5′ being turned upward to form the members 4 and 4′ which are generally parallel in the side projection to the legs 2 and 2′, respectively. Front directed loops are formed at 8 and 8′ by the two U-bends at 6 and 7 and 6′, 7′, respectively. These loops, which have a degree of lateral resilience due to the wire not touching where it crosses, enhance the side support for the telephone and help insure that the instrument fits snuggly in the cradle without binding. Means for attaching the pocket to a horizontal support such as bed rails are provided by the downwardly-projecting remaining ends of the wire 10 and 10′, which are bent into inverted U's, 9 and 9′, respectively, and directed inwardly toward each other to the point of intersection 1, where the wires intersect and are twisted together.

In FIG. 2, a cut-away is shown of the wire member whereby the wire core 12, is surrounded by a plastic sheath 11.

FIG. 1 depicts the bracket 18, removably affixed to two horizontal, parallel rails, 14 and 15. An integrated telephone receiver and speaker of the "Trimline" type 13, is disposed in downright, vertical position with the dial 17, and microphone 19, facing inward toward the bedridden user. The telephone cable is shown at 16 projecting upward from the top.

In operation, the telephone receiver rests snuggly against the bottom and sides which form the cradle and can easily be removed by simply lifting it out of the device. Further, the telephone cradle of this invention can be slid easily along the horizontal rails to which it is attached and presents no impediment to the raising or lowering of the bed rail on which it may be placed.

Various materials can be employed in the fabrication of this telephone cradle. Stiff metallic wire such as steel and aluminum can be used, for example, as long as they have sufficient strength and resiliency. A plastic or rubberized coating for the wire, while not mandatory, has the advantage of protecting the metal wire from corrosion and the telephone and bed rail from scratching, and further provides a measure of electrical insulation. The telephone cradle of this invention can, however, also be formed, for example, from plastic or fiberglass rods and tubes which may or may not be reinforced, as long as the material has the requisite degree of strength and durability.

It is, however, to be understood that the description and drawing contained herein are exemplary of a preferred embodiment of the present invention. It will be appreciated by those skilled in the art that other variations in configuration and materials are within the scope of the invention.

What is claimed is:

1. A bracket for holding a telephone receiver in an upright, vertical position and adapted for attachment to a horizontal member, said bracket comprising a cradle of appropriate dimensions to accommodate a telephone and means for removably attaching said cradle to a horizontal member; said cradle consisting of two opposing sides, a front and a bottom; the front of the cradle being an inverted U-shaped member with two generally parallel downward-projecting elongated members which are respectively attached at their ends at right angles to a shorter parallel elongated member which projects backward away from said inverted U-shaped member to form the bottom of said cradle; each of said two backward-projecting members being also respectively attached at their backward ends at right angles to an upward-projecting elongated member which is bent toward the front of the cradle into a loop which forms one of said sides of the cradle and which is, further, respectively attached at its top to one of two backward, horizontally-projecting elongated members which are turned downward at right angles so as to be roughly parallel to said two upward-projecting members and form means for attaching said cradle to a horizontal member.

2. A bracket for holding a telephone receiver in an upright, vertical position and adapted for attachment to a horizontal member, said bracket being formed of a single unitary elongated member and comprising a downward tapered cradle of appropriate dimensions to accommodate a telephone and means for attaching said cradle to the horizontal member; said cradle consisting of two opposing sides, a front and a bottom; the front of said cradle being formed by said single elongated member being bent at its midpoint into an inverted U-shaped member with two generally parallel downward-projecting legs of equal length, the bottom of said cradle being formed by each of the two downward-projecting legs which form the front of the cradle being further bent at right angles to form two shorter, horizontally backward-projecting members which are generally parallel to each other; each of said backward-projecting members being turned upward at right angles at its backward extremity to form two vertical projections which taper slightly away from each other at the top and which are each further bent toward the front of the cradle into a loop, each loop being respectively parallel to the other and forming the sides of the cradle; each of said vertical projections being further bent at its upward extremity backward and downward to form an inverted U with legs projecting downward to provide said means for attaching the cradle to a horizontal member.

3. The bracket of claim 2 wherein the cradle is of particular dimensions to accommodate a unitary telephone in which the microphone, dial and receiver are contained in a single, hand-held unit.

4. The bracket of claim 2 wherein said downward-projecting legs which provide means for attaching the cradle to a horizontal member are turned inward toward each other and terminate at their intersection.

5. The bracket of claim 2 wherein said unitary elongated member is a length of wire.

6. The bracket of claim 5 wherein said wire is provided with a plastic or rubber covering.

7. The bracket of claim 2 in which said sides of the cradle are resilient.

* * * * *